3,779,963
PROCESS FOR INTRODUCING FUNCTIONAL SUBSTITUENTS ONTO A POLYMER BACKBONE USING MILD OXIDATIVE CONDITIONS
Fred H. Ancker, Warren, N.J., and Dale F. Pollart, Charleston, W. Va., assignors to Union Carbide Corporation, New York, N.Y.
No Drawing. Continuation of application Ser. No. 66,630, Aug. 24, 1970, which is a continuation-in-part of application Ser. No. 610,461, Jan. 20, 1967, which in turn is a continuation-in-part of application Ser. No. 528,349, Feb. 18, 1966, all now abandoned. This application June 30, 1972, Ser. No. 267,996
Int. Cl. C08f 27/00, 27/22
U.S. Cl. 260—23 H                                    1 Claim

ABSTRACT OF THE DISCLOSURE

Process for grafting low molecular weight functionally substituted organic compounds to polyolefins by free radical combination reactions under mild oxidative conditions.

---

This application is a continuation of U.S. application Ser. No. 66,630, filed Aug. 24, 1970, now abandoned, which was a continuation-in-part of U.S. application Ser. No. 610,461, filed Jan. 20, 1967, now abandoned, which in turn was a continuation-in-part of U.S. application Ser. No. 528,349, filed Feb. 18, 1966, now abandoned.

The present invention relates to a method for modifying the properties of polyolefins, either in bulk or particulate form or at the surface of fibers, films or molded articles formed therefrom. More particularly, it relates to a method by which a functionally substituted low molecular weight organic compound is grafted onto a polyolefin under mild oxidative conditions.

The term "low molecular weight" as used herein and throughout the application refers to a molecular weight of less than 5,000.

Several methods have heretofore been employed for modifying polymers by grafting. Graft copolymers are generally prepared by creating free radical initiator sites on a host polymer chain which are reacted with an alpha, beta-ethylenically unsaturated monomer to give long branches of a polymer pendant from the host polymer chain or backbone. The free radical initiator sites on the host polymer can be generated by exposure to ionizing or actinic radiation with or without the presence of free radical initiators and/or photosensitizers. Alternatively the host polymer can be peroxidized or ozonized, yielding free radical grafting sites by decomposition of the hydroperoxides or ozonides upon heating. In all the techniques described above, grafting is achieved by addition polymerization of an unsaturated monomer from initiator sites on the backbone of the host polymer. When the grafting sites are generated by radiation, the reaction proceeds with or without oxygen. However, when the grafting sites are formed chemically, the addition reaction itself occurs without any further oxygen requirement.

A related type of grafting addition reaction heretofore employed consists of the reaction of functionally substituted unsaturated compounds such as maleic anhydride, N-methyl maleimide, fumaric acid and the like with unsaturated polymers. In this type of reaction, the functionally substituted compounds are attached to the host polymer by means of an addition reaction to the double bond of the substituted, unsaturated compound or of the double bond of said compound and that of the polymer. It is essential, however, that the addition reaction proceed in an oxygen-free environment. This reaction can proceed either in the presence or absence of free radical initiators.

Although the above grafting techniques have heretofore proven somewhat useful, they are nonetheless limited in general application. The attempted grafting of long polymeric segments to a polymer backbone has the disadvantages of causing major changes in the gross makeup of the polymer system resulting in major changes in the physical properties of the host or parent polymer. Similarly, although it is possible to introduce hydroxyl or carbonyl groups onto a polymer backbone by direct and extensive oxidation, such extensive oxidation is accompanied by sufficient degradation of the polymers to cause loss of desirable mechanical properties. This is particularly so in the case of polyolefins, especially high density polyethylene.

It was previously known to add peroxides to initiate free radical formation for grafting. In contrast thereto, the reaction of this invention does not require the addition of a free radical initiator such as a peroxide or an azo-compound. This addition is precluded insofar as the grafting compound per se forms a hydroperoxide, that is, convert to an initiator. This permits the use of inexpensive chemicals to serve as grafting compounds thereby realizing an important economic advantage.

Present technology for producing polyethylene with functionality is to co-polymerize the ethylene with monomers containing the desired functional groups. Although this approach is somewhat satisfactory for low density polyethylene, it is not so for high density polyethylene. This is simply because the catalytic reaction to form high density polyethylene (i.e. density of at least about 0.94 gm./cc.) is inhibited by the presence of monomers with functional groups. Therefore this invention now provides a method of adding functionality to high density polyethylene after polymerization without altering the high density chain structure.

Accordingly, it is an object of the present invention to provide a grafting process adapted to be conducted under relatively mild reaction conditions, thereby avoiding extensive changes in the host polymer.

It is another object to provide a grafting process wherein the species to be grafted onto the host polymer is grafted as an apparent unimolecular branch or a branch of low molecular weight whereby the grafted species causes little change in the physical properties of the host polymer and only adds favorable properties.

It is a further object to provide a grafting process wherein specific functional groups are grafted to a host olefin polymer to impart specific properties thereto without adversely effecting the gross physical properties of the host polymer.

The present invention provides a process for grafting functional groups onto polyolefins by treating such polyolefins with a low molecular weight organic grafting compound having an oxidation rate at least about 5 cc. of oxygen per gram per hour at 100° C., under oxidizing conditions commensurate with the oxidation rate of the grafting compound, and thereafter, recovering the resulting grafted polymer.

The introduction of functional groups into polymers has many useful applications, not only by enabling preparation of different types of polymers, but especially by providing means for improving the adhesion of bulk polymers to substrates such as reinforcing fillers and fibers and for modifying the surface of fibers, films and molded plastic articles for improved adhesion to dyes, ink, adhesives, etc. One of the specific advantages of the oxidative grafting process of the present invention is the surprising facility and simplicity with which it is now possible to attach functional groups to a polyolefin molecule or to a polyolefin surface.

In the present invention, low molecular weight functionally substituted organic compounds are directly grafted to polyolefin chains by means of free radical combination reactions. Although not wishing to be bound by any theory or mechanism, it is presently believed that the grafting reaction proceeds in the following manner. For purposes of convenient illustration, only

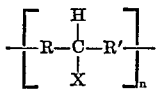

represents the repeating unit (reoccurring an arbitrary $n$ times) of a polyolefin, wherein R and R' are hydrocarbon groups and X is hydrogen or an organic group and $$Y-R''-H$$

is a readily oxidizable (i.e. oxidation rate in air of at least about 5 cc. $O_2$/gm./hr. at 100° C.) functionally substituted low molecular weight organic compound, wherein R'' is a hydrocarbon or heterohydrocarbon residue and Y is a functional group.

The oxidation of polyolefins to form hydroperoxides and the decomposition of the resulting polymer hydroperoxides to free radical species is known to proceed as shown:

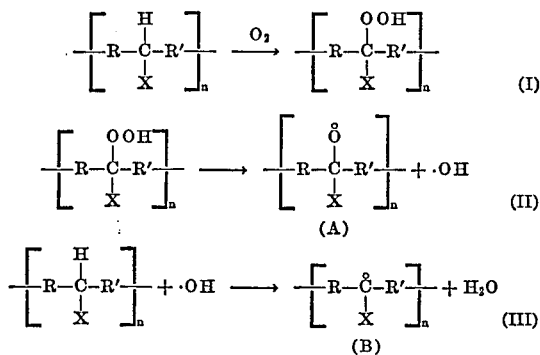

Both radical species A and B are capable of further reaction, and in fact have heretofore been used to achieve polymer grafting through their use as initiator sites for subsequent grafting of polymeric side branches by addition polymerization of unsaturated monomers.

Similarly the functionally substituted low molecular weight organic grafting compound is oxidized to free radical species as shown:

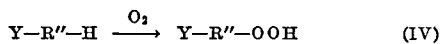
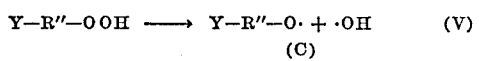
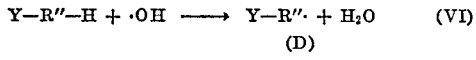

Under the relatively mild oxidation conditions, that is oxidative conditions at least minimally commensurate with the oxidation rate for the grafting compound, it has been found that the polyolefins free radicalize so as to obtain direct one to one grafts:

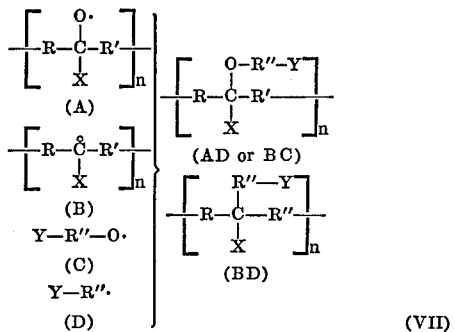

The radical combination products AD, BC and BD represent the functionally substituted, grafted polyolefins of the present invention. The products AA, AC and CC are unstable and revert to A and/or C. Similarly, peroxy radicals are, of course, formed as intermediates in reactions (I) and (IV) but are omitted here because they also only lead to unstable intermediary products.

The overall process of the present invention, as shown above, is particularly useful for the grafting of functional groups onto high molecular weight polyolefins, that is polyolefins having a molecular weight in excess of 10,000. The grafting reaction can be carried out under very mild conditions thus avoiding deleterious alteration of the polymer backbone. Additionally the added species are grafted on as an apparent unimolecular branch having little effect on the gross physical properties of the host polymer. Nevertheless, specific surface effects result, for example, from introduction of polar groups, and are dramatically evidenced.

Furthermore, the introduction of a wide variety of functional groups is possible. Thus, specific functional groups to give specific properties to a polymer are readily attached to the polyolefin chain.

Another aspect of this invention is grafting oxygen-containing functional groups (e.g. —OH, —C=O) a polymer employing a grafting compound which does not contain functional groups. This is accomplished by recognizing the certain nonfunctional grafting compounds having oxidation of at least 5 cc. of oxygen per gram per hour at 100° C. upon oxidation convert to free radicals having oxygen-containing functional groups. Thus the grafted polymer will contain oxygen-containing functional groups although the grafting compound per se does not contain such groups.

Examples of such low molecular weight grafting compounds include dipentene, squalene, cycloapentadiene, dicyclopentadiene, indene, tetrahydroindene, myrcene, vinylbicycloheptene, tetraline, ethylidene norbonene and the like. The kinetic steps of the present invention are considerably more complicated than indicated by the simplified reactions (I) to (VII). Also, a number of side reactions can occur, especially with the preferred, highly reactive grafting compounds. For these reasons, some practical aspects of the invention are outlined in the following discussion regarding the selection of optimum grafting compounds for given polyolefins.

In order to avoid undesirable changes in the polymer, it is necessary to suppress homo-termination of the polymer radicals, i.e. formation of the products AA, AB or BB. Homo-termination can lead to polymer cross-linking (by radical combinations) or polymer chain scission, that is, degradation (by radical disproportionations) and both of these reactions are generally considered undesirable. In contrast thereto, cross-termination of polymer and additive radicals should be favored, since this is in effect the reaction path resulting in formation of a grafted polymer.

Also, cross-termination is best achieved by using a grafting compound which oxidizes at a rate preferably appreciably higher than that of the host polymer. In this way, a concentration of additive radicals can be achieved which is in orders of magnitude higher than the concentration of polymer radicals. As a consequence thereof, the polymer radicals become inundated with additive radicals. Cross-termination (i.e. grafting) is thereby overwhelmingly statistically favored over homo-termination (i.e. direct polymer oxidation). It has been found experimentally that grafting compounds having an oxidation rate in excess of 5 cc. of oxygen per gram per hour at 100° C. are effective in achieving grafting while suppressing homo-termination when used in conjunction with polymers having oxidation rates at least equivalent to polyethylene.

An alternative and less sophisticated approach to grafting comprises employing the grafting compound in a gross stoichiometric excess. The grafting effect is somewhat similar by forcing cross-termination through exceedingly high concentrations of additive radicals relative to the concentration of polymer radicals. A large stoichiometric excess is thus particularly desirable if high levels of grafting are desired. This alternative technique may of course be employed in reactions involving bulk polymer modifications by grafting as well as in polymer surface modifications where the grafting additive is dissolved within the polymer surface prior to oxidation.

It is also possible to favor the cross-termination over the homo-termination reactions by appreciating and utilizing radical polarity effects and steric effects. For example, the radicals (A and B) formed by reactions (I) to (III) for polymers such as polypropylene and polymethylene oxide have a negative polarity and would therefore preferentially cross-terminate with grafting radicals (C and D) formed by reactions (IV) to (VI), from grafting compounds such as crotonamide or sorbamide, which have a positive radical polarity. Conversely, polymers such as the polyamides, and polyacrylonitrile, which form radicals with positive polarities, would favor cross-termination (grafting) with the negatively polarized radicals formed by oxidation of grafting compounds such as allylic ethers. It may in some instances also be possible to utilize steric effects, for example, by having "tailored" sufficiently bulky side groups on the grafting additive so that homo-termination (oxidative dergadation) of the grafting compounds is reduced. However, this latter aspect is usually of less comercial importance since many grafting compounds pursuant to this invention are readily commercially available at low cost.

The overall process of the present invention, as shown above, is particularly useful for the grafting of functional groups onto high molecular weight polyolefins, that is polyolefins having a molecular weight in excess of 10,000. The grafting reaction can be carried out under very mild conditions thus avoiding deleterious alteration of the polymer backbone. Additionally the added species are grafted on as an apparent unimolecular branch having little effect on the gross physical properties of the host polymer. Nevertheless, specific surface effects result, for example, from introduction of polar groups, and are dramatically evidenced.

Furthermore, the introduction of a wide variety of functional groups is possible. Thus, specific functional groups to give specific properties to a polymer are readily attached to the polyolefin chain.

Another aspect of this invention is grafting oxygen-containing functional groups (e.g. —OH, —C=O) a polymer employing a grafting compound which does not contain functional groups. This is accomplished by recognizing the certain nonfunctional grafting compounds having oxidation rates of at least 5 cc. of oxygen per gram per hour at 100° C. upon oxidation convert to free radicals having oxygen-containing functional groups. Thus the grafted polymer will contain oxygen-containing functional groups although the grafting compound per se does not contain such groups.

Examples of such low molecular weight grafting compounds include dipentene, squalene, cyclopentadiene, dicyclopentadiene, indene, tetrahydroindene, myrcene, vinylbicycloheptene, tetraline, ethylidene, norbornene and the like.

For example when oxygen-containing functional groups are attached to the host polyolefin the then grafted polyolefin exhibits improved wettability and adhesion characteristics.

Although the invention is particularly suited to polyolefins, broad ranges of thermoplastic polymers, copolymers and terpolymers are also suitable pursuant to the present invention. In fact those polymers having oxidation rates in air greater than polyethylene are found to be suitable. For example, polystyrene has benzylic hydrogen, (approximately 25 kilocalories weaker than primary carbon-hydrogen bonds) and is therefore found to be suitable. All unsaturated polymers are likewise included since they contain allylic hydrogens, e.g., the polydienes such as polybutadiene, cis and trans-1,4-poly(isoprene); acrylonitrile/butadiene/styrene polymers and the like. Polyvinyl chloride and vinyl chloride copolymers contain hydrogens at least and usually more readily oxidizable than polyethylene and are also applicable. (Chlorine substitution, for example, lowers the carbon-hydrogen bond strength on that carbon by about 6 to 8 kilocalories. Thus, hydrogens on secondary, chlorine substituted carbon atoms are more easily oxidized than primary carbon-hydrogen bonds to a degree of about 15 kilocalories). Copolymers of ethylene with vinyl acetate, acrylates and other vinyl monomers are included. Poly acrylic and methacrylic acid esters such as poly ethyl acrylate, poly methyl methacrylate and the like are also suitable in the present invention. Aliphatic polyethers such as poly-formal and poly-(alkylene oxides) are also included.

Preferred polymers are of course polyolefins. For example high and low density polyethylene, polypropylene, poly (butene-1), poly-4-methyl pentene-1 and the like and interpolymers and copolymers thereof.

The low molecular weight functionally substituted organic grafting compounds suitable pursuant to this invention have the general formula:

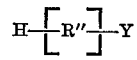

wherein Y is at least one functional substituent selected from the group consisting of carboxyl, carboxamido, alkoxycarbonyl, aryloxycarbonyl, hydroxyl, mercapto, sulfo, sulfamino, sulfamyl, phosphoryl, halo, silico, amino, ammonium and phosphonium; R'' is a substantially inert hydrocarbon or heterohydrocarbon residue; and H is at least one readily oxidizable hydrogen directly bonded to a carbon of R'' whereby there is formed a carbon-to-hydrogen bond such as, allylic, benzylic, tertiary aliphatic aldehydro, α-oxyahydrocarbyl of α-halohydrocarbyl hydrogens.

Suitable substantially inert heterohydrocarbons and hydrocarbon residues represented by R'' which can be used in the present invention are, for example, heterocyclic residues of such heterocyclics as pyrrole, furan, thiophene, imidazole, oxazole, thiazole, pyrazole, 3-pyrroline, pyrrolidiene, pyridine, pyrimidine, purine, quinoline, isoquinoline, carbazole, and the like; linear heterohydrocarbons such as diphenyl oxide, thio bis-phenols, and the like; hydrocarbon residues of such hydrocarbons as the linear and branched alkyls, cycloalkyl, aryls, alkaryls, aralkyls; and including substituted heterohydrocarbons and hydrocarbon residues wherein the substituents can be halogen, cyano, alkoxy, aryloxy, carboalkoxy, carboaryloxy, acryloxy, aroyloxy, carboalkyl, carboaryl, hydroxyl, and the like.

Specifically and preferably suitable in the practice of this invention are the aforementioned grafting compounds having oxidation rates in excess of about 5 cc. oxygen per gram per hour at 100° C. that is, they are characterized by high susceptibility of one or more of their hydrogen atoms towards auto-oxidation.

For example, derivatives of aliphatic and alicyclohydrocarbons containing one or more allylic hydrogens such as myrcene, ocimene, limonene, cyclohexadiene, dicyclopentadiene, Tetraline, indene, tetrahydroindene, ethylidene norbornene, all have oxidation rates above 5 cc. of oxygen per gram per hour at 100° C. Similarly, highly unsaturated fatty acids such as licanic acid, elaeostearic acid, linolenic acid, linoleic acid, crotonic and sorbic acid as well as adducts of these and other unsaturated aliphatic and alicyclic compounds with compounds such as maleic acid, acrylic acid, acrolein and the like. Also included in this category are compounds with highly reactive benzylic hydrogens such as cumene, paraisopropylbenzoic, and the like.

Excluded from this category by having oxidation rates lower than 5 cc. of oxygen per gram per hour at 100° C. are compounds having only primary and secondary hydrogens such as normal aliphatic hydrocarbons and their derivatives such as stearic acid and the esters and amides thereof. Also excluded are compounds such as isovaleric acid, isobutyric acid (oxidation rate .3 ml. $O_2$/gm./hr. at 100° C.), oleic acid and methyl oleate as well as most unsaturated monomers for addition polymerization such as methacrylic acid and esters, maleic and fumaric acids, acid anhydrides and esters, vinyl halides and esters, styrene and acrylonitrile. Also excluded are of course most saturated chlorinated hydrocarbons such as chloroform, trichloroethane, chlorobenzene as well as most aromatic hydrocarbons such as benzene and xylene, most esters such as methyl acetate, ethyl benzoate and the like and most ketones such as acetone, methyl ethyl ketone and the like.

The oxidation process can be carried out under a variety of relatively mild oxidation conditions ranging from exposure to atmospheric oxygen, ozone, liquid or gaseous oxidants, flame treatment, corona and glow discharge, to exposure to actinic or ionizing radiation in the presence of oxygen, and the like. The specific choice of oxidation conditions employed is dependent upon the ease of oxidation of the particular grafting additive employed. Specifically, the intensity of the oxidation conditions employed must be commensurate with the ease of oxidation of the particular type of hydrogen present on the grafting additive. For example, as will be shown in the examples presented herein below, hydrogens activated by conjugation (reinforced allylic activation) or by ring strain (e.g. alicyclic compounds), are more reactive than simple allylic hydrogens. Accordingly, grafting can be obtained with an additive containing reinforced allylic activation under relatively milder oxidation conditions than with an additive containing simple allylic hydrogens. Thus, as used herein and in the appended claims, the phrase "oxidizing conditions commensurate with the rate of oxidation of the grafting compound" connotes that the intensity of the particular oxidation conditions or technique employed substantially corresponds with the rate of oxidation of the particular type of grafting compound. Any of the oxidation techniques suitable for obtaining grafting in the present invention, however, are relatively mild in comparison to those heretofore required for direct oxidation of polymers.

In the foregoing specification and in following examples oxidation rates were determined by the general method as described by Stirton et al., Oil and Soap, 22, pages 81–83 [1945], with modifications thereto as described hereinbelow.

A one gram sample is added to a 125 ml. Erlenmeyer flask, such flask does not contain a center well. The flask is fitted with a Barcroft-Warburg apparatus and the flask is then evacuated and then filled with oxygen. This evacuation cycle is repeated at least ten times. After the last oxygen filling, the flask is then placed in a heating bath, which bath is maintained at 100° C.±0.2° C. and the oxygen pressure adjusted to 760 mm. Hg or the vapor pressure of the sample, whichever is the higher. The apparatus is then sealed and the oxygen uptake recorded as a function of time. No agitation of the flask is employed. The method is continued for a period of six hours or until an oxygen uptake of 40 cc. had occurred, whichever occurred first.

For the purpose of this invention, the induction period is disregarded in calculating the oxidation rate. Instead, a linear average is taken of the relatively steady rising curve of consumed oxygen (in cc.) versus time (in hours). It has been found that the induction period often is influenced more by differences in impurities than by differences in oxidation susceptibility between samples, whereas the slope of the nearly steady state part of the curve is much less effected by such impurities.

It is often difficult to perform oxidation rate determination at 100° C. for compounds which have very low boiling points or very high melting points. In such cases, the determinations may be made at two temperatures as close to 100° C. as possible and the results then extrapolated to 100° C. Alternatively, the compounds may be dissolved in a solvent which itself has an oxidation rate at 100° C. less than 0.5 cc. $O_2$/hr./gram. In this latter case, at least two solutions of different concentrations must be made and the results extrapolated to a solventless material. The solution method is generally not desirable because different solvents often have different effects on the oxidation rate of the sample.

Experimental results in accordance with the above procedure, showing oxidation rates for several compounds are presented in Example 17.

All oxidation rates in the examples are given in cubic centimeters per gram per hour at 100° C.

The following examples are merely illustrative of the present invention and are not to be construed in any way as a limitation thereof. Unless otherwise specified, all percentages and parts are by weight.

EXAMPLE 1

This example illustrates the reaction of polyethylene with a long-chain aliphatic acid containing activated allylic hydrogens using air oxidation.

To 1.0 gram of low molecular weight, high density, powdered polyethylene in a small aluminum boat was added an acetone solution of 1.0 gram of dehydrated castor oil fatty acid (80% linoleic acid). The mixture was stirred to wet the polymer sample thoroughly, and the acetone allowed to evaporate at room temperature. The sample was then placed in an air circulating oven set at 150° C. for one hour.

After removing from the oven, the homogeneous, yellow, oily reaction mixture was dissolved in about 40 ml. of hot xylene, and then coagulated from this solution by pouring into about 400 ml. of acetone. The resulting fine, white precipitate was collected by filtration, and redissolved in hot xylene. Re-coagulation again gave a fine white precipitate which was collected by filtering and then dried overnight in a vacuum oven at about 60° C.

The infrared spectrum of the dried powder was determined from a potassium bromide pressing. An absorption band at 5.8–5.85μ, characteristic of carboxylic acids and not normally present in polyethylene, was observed. No such absorption band was observed in the spectrum of the product from a control experiment which was carried out in the exact same manner as that described above except that the reaction mixture was not placed in the air circulating oven. Neither was any corresponding absorption peak observed in the spectrum of a sample of the same polyethylene which was placed in the oven at 150° C. for one hour but without any added linoleic acid. The spectrum of linoleic acid (98%) exhibits a strong absorption maximum at about 5.83μ.

EXAMPLE 2

This example illustrates the reaction of polyethylene with short-chain aliphatic acid containing reinforced allylic hydrogens using chromic acid oxidation.

About 10 grams of powdered, high density (0.95 gm./cc.) polyethylene was stirred into about 20 ml. of a saturated solution of sorbic acid (Oxid. rate 9.0) in methanol in a small beaker. The beaker was then placed on a steam bath at 100° C. for one hour to allow the methanol to evaporate. The resulting dry powder was transferred to a flask containing a saturated solution of chromic acid in water and oxidized in this solution at 60° C. for 15 minutes using a magnetic stirrer to wet the powder thoroughly. The powder was then filtered off on a porcelain filter, washed with distilled water until the filtrate was free of chromium and then transferred to a 1000 ml. flask containing 500 ml. of 1 N potassium hydroxide in methanol. The powder was hydrolyzed in this solution to remove unreacted sorbic acid by boiling for three hours using a reflux condenser, filtered off on a porcelain filter and then transferred to another 1000 ml. flask containing 500 ml. of 1 N hydrochloric acid in a 1:1 mixture of methanol and water. The powder was reacidified in this solution by boiling for half an hour using a reflux condenser, filtered off on a porcelain filter, washed with distilled water until the wash-water was free of chloride and then transferred to filter paper for drying at ambient conditions overnight. The dry powder was then heated in a hydraulic press between aluminum foil and molded into a 4–5 mil film sample for infrared analysis.

The infrared spectrum exhibited a strong absorption peak at about $5.8\mu$ characteristic of carboxyl. This absorption peak was absent in the original polyethylene sample and also in a control sample which had been treated exactly as described above except that the methanol used for impregnation of the polyethylene powder did not contain sorbic acid.

EXAMPLE 3

This example illustrates the reaction of polyethylene with an aromatic acid containing benzylic hydrogens using air oxidation. A mixture of 1.0 gram of powdered polyethylene and 1.0 gram of p-isopropylbenzoic acid was prepared and treated exactly as described in Example 1. The infrared spectrum of the dried product again showed an absorption maximum at about $5.85–5.9\mu$ which was not present in a corresponding control sample. Para-isopropylbenzoic acid shows a strong absorption in the infrared at about $5.9\mu$.

EXAMPLE 4

This example illustrates the reaction of polypropylene with an aliphatic ester containing multiple-activated allylic hydrogens using air or chromic acid oxidation. 20 grams of a commercial grade of powdered polypropylene resin was added under stirring to a beaker containing 500 ml. of fresh linseed oil (Oxid. rate 95.0) at 135° C. After three minutes, the polypropylene was quickly filtered off on a fritted glass filter and washed repeatedly with diethylene glycol monoethyl ether acetate until it was free of adhered linseed oil. Washing was then continued using distilled water until there no longer was any perceptible odor of diethylene glycol monoethyl ether acetate. The powder was then spread out on filter paper and allowed to dry overnight at room temperature. The dry, impregnated powder was subsequently stored in a closed glass jar at room temperature for two weeks.

About 5 grams of the impregnated resin powder was then hydrolyzed as described in Example 2, washed in methanol and water, dried at room temperature and pressed into a 4–5 mil film for infrared analysis as before. Another 5 grams of the impregnated resin was hydrolyzed and reacidified as described in Example 2 and was similarly prepared into a film specimen for infrared analysis.

The remaining about 10 grams of the impregnated resin powder were oxidized in a saturated aqueous chromic acid solution at 80° C. for 4 minutes, filtered and washed with water as before and similarly prepared into one hydrolyzed and one hydrolyzed/reacidified film specimen for analysis.

Finally, a control sample of the original powdered polypropylene resin was treated exactly as the chromic acid treated samples except that the preliminary impregnation with linseed oil was omitted.

The two hydrolyzed samples of the linseed oil impregnated resin showed essentially no absorption bond at about $5.73\mu$ (linseed oil has a strong adsorption bond at $5.73\mu$ due to ester carbonyl) indicating that unreacted linseed oil was effectively removed by the hydrolysis treatment. However, a strong, broad absorption band was seen at about $6.3–6.4\mu$. This band, which is ascribed to the carboxylate ion, is absent in linseed oil as well as in polypropylene. In the two reacidified samples of the linseed oil impregnated resin, the $6.3–6.4\mu$ absorption band had essentially disappeared while a strong absorption peak now was found at about $5.83\mu$, the wavelength for carboxylic acid. The described spectral changes were somewhat stronger in case of the chromic acid oxidized samples, but they were nevertheless surprisingly strong even in the samples which had been exposed only to air oxidation at room temperature.

The above described absorption bands were all absent in the chromic acid oxidized polypropylene control which had not received the linseed oil impregnation treatment.

EXAMPLE 5

This example illustrates the reaction of polypropylene with a short-chain aliphatic acid containing reinforced allylic hydrogens using air oxidation.

Twenty grams of sorbic acid was melted in a small beaker and heated to 140° C. Ten grams of a commercial polypropylene resin in powder form was then stirred into the molten sorbic acid and the sample was subsequently left in a ventilated air oven at 140° C. for 10 minutes. After cooling, the sample was washed repeatedly with boiling methanol to remove excess sorbic acid. The resin powder was next filtered on a fritted glass funnel, transferred to filter paper and allowed to dry at room temperature over-night.

Samples of the impregnated resin were hydrolyzed as well as hydrolyzed and reacidified and prepared into 4–5 mil film specimens as described in Examples 2 and 4. Also, a control was treated exactly as above except that the polypropylene powder was treated by itself without any added sorbic acid.

The "hydrolyzed" sample of the sorbic acid treated polypropylene exhibited a broad infrared absorption band at $6.3–6.4\mu$ characteristic of carboxylate ions. In the "reacidified" version of this sample, this absorption band was absent and was replaced by a strong absorption band at $5.8–5.9\mu$ characteristic of carboxyl. These bands were totally absent in the "hydrolyzed" and "reacidified" samples of the control.

EXAMPLE 6

A 15 grams sample of powdered isotactic polypropylene resin was added to a solution of 0.15 gram of linoleic acid dissolved in diethyl ether. The mixture was stirred for 10 minutes. After stirring the diethyl ether was allowed to evaporate at 25° C., leaving a residue of treated polymer particles. The treated polymer particles were heated to 135° C. in dry nitrogen. Thereafter the particles were oxidized with air, at 135° C. for a period of 30 minutes.

The treated resin was allowed to cool to 25° C. and was then completely dissolved in o-dichlorobenzene. This solution was then divided into equal aliquot samples. The first (Sample A) was precipitated out using methanol. The second (Sample B) was precipitated out with a 1 N solution of KOH in methanol. Both filtrates were then washed repeatedly with their respective solvents to remove unreacted linoleic acid. Thereafter the filtrates were dried and pressed into 5 mil films and analyzed by infrared rays.

Four additional polypropylene samples were treated in the same manner as above with the exception that in each case a different treating compound in place of linoleic acid.

A control sample was run in the manner described above in which no treating compound was added.

A table showing the infra-red analysis of the several treated films is presented below. The denoted absorption bands indicate the presence of carbonyl bonds thereby indicating actual grafting.

| Treating compound | Oxidation rate | Sample | Infra-red analysis | |
|---|---|---|---|---|
| | | | (5.7–5.9) | (6.3–6.4) |
| None (control) | | A | None | None. |
| Do | | B | do | Do. |
| Tung oil acids | 87 | A | V. strong | Do. |
| Do | 87 | B | None | Broad. |
| Linoleic acid | | A | Strong | None. |
| Do | | B | None | Broad. |
| Maleic anhydride | | A | do | None. |
| Do | | B | do | Do. |
| Oleic acid | <1.0 | A | do | Do. |
| Do | <1.0 | B | do | Do. |
| Stearic acid | <0.1 | A | do | Do. |
| Do | <0.1 | B | do | Do. |

The intensive washing of the treated resin ensured the removal of unreacted treating compounds. All infra-red absorption therefore indicate grafted components only.

EXAMPLE 7

This example illustrates the reaction of polypropylene with a short-chain aliphatic acid amide containing reinforced allylic hydrogens using air oxidation.

A mixture of 1.0 gram of powdered, isotactic polypropylene and 5.0 grams of sorbic acid amide (sorbamide) was treated under the same conditions as described in Example 1. The final, dried product exhiibted strong, broad infrared absorption bands at 3.0–3.1 and 5.9–6.1$\mu$. These peaks are characteristic of carboxylic acid amides, and were not observed in the product from the corresponding control experiment. A sample of the same polypropylene alone which had been placed in the air circulating oven at 160° C. for one hour showed an absorption maximum in the infrared at 5.8$\mu$ characteristic of carboxylic acids. This is distinct from the 5.9 to 6.1$\mu$ amide absorption band.

EXAMPLE 8

This example illustrates the reaction of polypropylene with an alicyclic acid containing reinforced allylic hydrogens using air oxidation.

Substantially the same procedure was used as described in Example 5 except that abietic acid was used instead of sorbic acid. However, because of the higher melting point of abietic acid, the acid was heated to 165° C. before addition of the polypropylene powder.

As in Example 5, a broad infrared absorption band at about 6.45$\mu$ was found after hydrolysis, which shifted to an absorption band at about 5.92$\mu$ after reacidification. Abietic acid itself has a strong absorption band at about 5.92$\mu$.

EXAMPLE 9

The procedure of Example 6 was repeated with powdered polyethylene resin in lieu of polypropylene. Other modifications were to reduce the preheat and reaction temperature from 135° C. to 120° C. and increase the grafting period from 30 minutes to 60 minutes.

Similar infra-red analysis results as in the table of Example 6 were found.

EXAMPLE 10

The procedure of Example 6 was repeated with powdered poly-4-methyl pentene-1, resin in lieu of polypropylene. Other modifications were to increase the preheat and reaction temperature to 200° C. and the grafting period was reduced to 15 minutes. Also maleic acid was substituted for maleic anhydride.

Similar infra-red analysis results as in the table of Example 6 were found.

EXAMPLE 11

This example illustrates the reaction of polystyrene with an aromatic acid containing benzylic hydrogens using air oxidation.

A stream of oxygen was bubbled slowly through a stirred solution of 2.2 grams of atactic polystyrene and 3.3 grams of p-isopropylbenzoic acid in 50 ml. of o-dichlorobenzene while maintaining the temperature of the solution at 170° C. After one hour, a 10 ml. aliquot was removed and the dissolved polymer coagulated in about 200 ml. of methanol. The bulk of the reaction was continued for a total of 4½ hours, and then the remainder also coagulated in methanol.

The control experiment in this case was carried out in the same manner except that the reaction mixture contained no p-isopropylbenzoic acid.

The polymer isolated from the reaction flask after one hour exhibited an infrared absorption peak at 5.75$\mu$ of greater intensity than would normally be expected (polystyrene itself has an infrared absorption band at 5.73$\mu$, but it is normally weaker than the neighboring 5.65$\mu$ band), as well as a new, small peak at 5.91$\mu$. The infrared spectrum of the control specimen taken after one hour appeared completely normal.

The polymer isolated from the reaction mixture containing p-isopropylbenzoic acid after a reaction time of 4½ hours again showed the abnormal 5.75$\mu$ infrared maximum, but in addition exhibited a moderately strong 5.91$\mu$ band. The control sample after 4½ hours also showed the 5.75$\mu$ band in the infrared, but no absorption in the 5.9$\mu$ region. The absorption maximum for the carboxyl group of p-isopropylbenzoic acid occurs at about 5.9$\mu$.

EXAMPLE 12

This example illustrates the improvement in paint adhesion achieved by grafting of polar groups onto the surface of polypropylene articles.

Circular discs, ⅛-inch thick by 4-inches in diameter were injection molded from a commercial grade of polypropylene resin (JMD–4500).

Specific gravity—0.905 (ASTM–D–792–50)
Melt flow—4. dg./min. at 230° C. and 44 p.s.i. (ASTM–D–1238)

The discs were cleaned for 5 minutes in a slightly alkaline, aqueous solution and then rinsed for one minute in distilled water. The discs were then immersed for 2 minutes in a bath containing linseed oil at 135° to 140° C. to impregnate the surfaces of the discs with this functionally substituted grafting compound. The impregnated discs were cooled to room temperature and the excess linseed oil was removed by washing them for 5 minutes in diethylene glycol monoethyl ether acetate and subsequently rinsing them for 1 minute in distilled water. The discs were then immersed for 4 minutes in a chromic acid/sulfuric acid oxidizing bath containing 29 parts of chromium trioxide, 29 parts of sulfuric acid and 42 parts of deionized water. The oxidizing bath was maintained at 80° C. The impregnated and oxidized discs were then rinsed in distilled water until no trace of the chromic acid/sulfuric acid oxidizing bath was visible in the rinse water. The samples were air dried overnight.

Discs from the same batch of injection molded pieces which had received no treatment were selected as controls.

Samples of the treated and control discs were coated with the following: aluminum-filled phenolic varnish, phenolic/tung oil varnish or alkyd enamel. After being allowed to air dry (15 days) the samples were tested for adhesion by scoring through the coating and attempting to peel the coating off. Continuous films of each of the three paints could be peeled readily from the control samples. Coatings could not be peeled from any of the samples which had been impregnated with linseed oil and oxidized prior to painting. The grafting process of the present invention produced a surface on polypropylene molded articles to which conventional paints adhered tenaciously.

EXAMPLE 13

This example illustrates the improvement in glue adhesion achieved by grafting of polar groups onto the surface of polypropylene articles.

Plaques, injection molded from polypropylene (JMD-4500), were treated as in Example 12.

Control plaques from the same batch of moldings were obtained. Adhesive compositions A and B were prepared as follows:

| Adhesive A | { ERL-2772 | 100 parts by weight. |
| | ZZLA-0814 | 20 parts by weight. |
| Adhesive B | { ERL-2772 | 100 parts by weight. |
| | Versamid 125 | 50 parts by weight. |
| Bakelite | ERL-2772 | Diglycidyl ether of Bisphenol-A. |
| Do | ZZLA-0814 | Tri-amine hardener. |
| Bersamid | 125 | Polyamide hardener. |

The adhesive compositions were applied to both the treated and control discs and then cured for 16 hours at 60° C. with the following results:

| Polypropylene | Adhesive | Cure at— Hrs. | °C. | Bond |
| --- | --- | --- | --- | --- |
| Treated and control | A | 16 | 60 | Excellent adhesive but brittle. |
| Control | A | 16 | 60 | None. |
| Treated and control | B | 16 | 60 | Excellent and tough. |
| Control | B | 16 | 60 | None. |

The following hot melt adhesive was also employed:

Thermogrip #1165 (a polyester resin based hot melt adhesive) B.B. Chemical Div. of United Shoe Machinery Corporation specific gravity—1.3 gms./cm.$^3$
softening range—295°–305° F.
viscosity—90,000 c.p.s. at 420° F.

The adhesive was melted, applied to one side of a polypropylene sample and while the adhesive was still molten, the other piece of polypropylene was applied under light manual pressure and held until the adhesive had solidified with the following results:

Treated sample to treated sample—good bond
Treated sample to untreated sample—poor bond
Untreated sample to untreated sample—poor bond

EXAMPLE 14

This example illustrates the improvement in dye adsorption achieved by grafting of polar groups onto the surface of polypropylene articles.

An injection molded polypropylene plaque (A) was impregnated in linseed oil (Oxid. rate 45.0) and treated in a chromic/sulfuric acid bath as described in Example 12. Another plaque (B) was treated identically except for omission of the linseed oil treatment. A third plaque (C) was used as a control and received no treatment except the initial cleaning in a dilute alkaline solution.

After washing in deionized water, plaques A and B were immersed in a slightly acidic solution of methyl violet (a triphenyl methane dye, Color Index 42555). These two samples were then washed in deionized water until there was no trace of dye in the wash water. After drying, the total diffuse light reflectance (at 590 mμ) was measured with the following results:

| Sample: | Light reflectance at 590 mμ, percent |
| --- | --- |
| A | 31 |
| B | 59 |
| C (reference) | 63 |

It is seen that the difference between sample A and the reference (63−31=32) is very much greater than between sample B and the reference (63−59=4), illustrating a dramatic improvement in dye adsorption due to the presence of grafted polar groups. It was noted that samples A and B both were easily wettable with water (sample C was not).

EXAMPLE 15

This example illustrates the reaction of polypropylene with an unsubstituted alicyclic hydrocarbon containing ring-strain activated allylic hydrogen using chromic acid oxidation.

Ten grams of isotactic polypropylene in powder form was added to 100 ml. dipentene (Oxid. rate 94.0) at 80° C. in a beaker. After two minutes, the polypropylene powder was filtered off and washed with n-hexane. Washing was repeated two times. The resin powder was then immersed in a hot chromic acid solution containing 65% by weight of $CrO_3$ in water. The temperature of the chromic acid was 80° C. The powder was so treated for 5 minutes. The powder was then filtered off on a sintered glass filter and washed repeatedly with water until no trace of chromic acid could be detected in the filtrate. Hydrolyzed and reacidified resin samples were then prepared for infrared analysis as previously described in Example 2. A set of control samples were prepared in exactly the same way except that the initial treatment with dipentene was omitted.

The dipentene treated samples showed the carbonyl band acid/base shifts characteristic of carboxyl-carbonyl described in earlier examples whereas the control samples showed no carbonyl absorption bands whatever.

This example thus shows that it is possible to introduce functional groups into a polyolefin using an originally unsubstituted grafting compound, presumably because the grafting compound disintegrates into oxidized radical fragments as a result of the oxidation treatment.

EXAMPLE 16

This example illustrates the improvement in wettability of corona treated polyethylene film achieved by pre-adsorbing a hydrocarbon having ring strain activated allylic hydrogens into the film surface.

Two mil low-density polyethylene film was extruded on a laboratory film extruder and subjected to in-line corona discharge treatment. While the line was operating, a closed container containing nitrogen at a slight over-pressure, the container having entrance and exit slots for the film was inserted between the extruder die and the first cooling roll. The container had an electrically heated pan filled with dipentene. The dipentene was heated to 120° C. so as to cause absorption of minute amounts of dipentene vapor into the polyethylene film as it passed through the pot. Four film samples were taken as follows:

| Sample | Corona discharge | Dipentene absorption | Wetting tension (dynes/cm.) |
| --- | --- | --- | --- |
| A | No | No | 31 |
| B | Yes | No | 37 |
| C | No | Yes | 33 |
| D | Yes | Yes | 48 |

EXAMPLE 17

In accordance with the experimental procedure for determining oxidation rates as herein before described, Table I is presented below to illustrate compounds having high oxidation rates and Table II is presented below to illustrate compounds having low oxidation rates.

TABLE I

| Compound: | Oxidation rate |
| --- | --- |
| Ethylidene norbornene | 95 |
| Dipentene (Limonene) | 94 |
| Tung oil | 87 |
| Dicyclopentadiene | 84 |
| Tetrahydroindene | 80 |
| Terpinolene | 76 |
| Turpentine | 63 |
| Vinyl bicyclo heptene | 61 |
| Methyl linoleate | 58 |
| Myrcene | 56 |
| Cyclohexane | 52 |
| Linseed oil | 45 |
| Indene | 33 |
| Tetralin | 21 |
| Sorbic acid (as 10% n-butanol) | 9 |
| Isopropyl benzene (cumene) | 8 |

TABLE II

| Compound: | Oxidation rate |
|---|---|
| Maleic acid | <2 |
| Methacrylic acid | <2 |
| Oleic acid | <1 |
| Stearic acid | <0.1 |
| Isobutyric acid | 0.3 |
| Methyl oleate | 0.6 |
| Methyl stearate | <0.1 |
| Ethyl benzoate | <1 |
| Methyl ethyl ketone | <2 |
| Methyl n-amyl ketone | <1 |
| Benzene | <2 |
| Xylene | <2 |
| Chlorobenzene | <2 |
| 1,1,1-Trichloroethane | <2 |
| 1,1,2-Trichloroethane | <2 |

What is claimed is:

1. A process for introducing functional substituents selected from the group consisting of carbonyl, carboxamide, alkoxy carbonyl, aryloxy carbonyl, hydroxyl, sulfo, sulfamino, sulfamyl, phosphoryl, halo, silico, amino, ammonium and phosphonium to the backbone of a polyolefin having a molecular weight of at least 10,000 without altering the gross physical properties of the polyolefin, which comprises mixing and contacting the polyolefin in the presence of oxidizing oxygen with a readily oxidizable low molecular weight compound which has a high oxidation absorption rate of at least 5 cubic centimetters of oxygen per gram per hour at 100° C. at the minimum temperature at which said readily oxidizable low molecular weight compound is oxidized by reaction with said oxygen, and for a period of time sufficient to cause said readily oxidizable low molecular weight compound to graft onto the backbone of said polyolefin and introduce said functional substituent to said backbone, said readily oxidizable low molecular weight compound is selected from the group consisting of nonfunctional substituted low molecular weight compounds from the class of dipentene, cyclohexane, squalene, cyclopentadiene, dicyclopentadiene, indene, tetrahydroindene, myrcene, vinylbicycloheptene, tetralin, and ethylidene norbornene, and functionally substituted low molecular weight compounds of the formula:

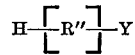

wherein Y is at least one functional substituent selected from the group consisting of carboxyl, carboxamido, alkoxy carbonyl, aryloxy carbonyl, hydroxyl, sulfo, sulfamino, sulfamyl, phosphoryl, halo, silico, amino, ammonium and phosphonium; R'' is a substantially inert hydrocarbon or heterohydrocarbon residue; and H is at least one readily oxidizable hydrogen directly bonded to a carbon of R'' and is selected from the group consisting of allylic, benzylic, tertiary aliphatic, aldehydo, α-oxahydrocarbyl and α-halohydrocarbyl hydrogens.

References Cited

UNITED STATES PATENTS

| | | | |
|---|---|---|---|
| 2,924,584 | 2/1960 | Wolinski | 260—878 |
| 3,153,029 | 10/1964 | Tabar et al. | 260—94.9 |
| 3,342,771 | 9/1967 | Cheritat et al. | 260—94.9 |
| 3,676,190 | 7/1972 | Landler et al. | 260—878 |

DONALD E. CZAJA, Primary Examiner

E. C. RZUCIDLO, Assistant Examiner

U.S. Cl. X.R.

260—94.9 GC, 94.9 GD, 878 R